US012781060B2

(12) United States Patent
Radwan et al.

(10) Patent No.: US 12,781,060 B2
(45) Date of Patent: Nov. 3, 2026

(54) SOLVENT-FREE FUNCTIONALIZED MESOPOROUS CARBON/ZINC OXIDE NANOADDITIVES FOR REMARKABLE IMPROVEMENT IN CORROSION RESISTANCE OF POLYMERIC COATINGS

(71) Applicant: Qatar Foundation for Education, Science and Community Development, Doha (QA)

(72) Inventors: Ahmed Bahgat Radwan, Doha (QA); Abdul Shakoor, Doha (QA); Amani Gamal Sabri Hassanein, Doha (QA); Adnan Khan, Doha (QA); Paul C. Okonkwo, Salalah (OM); Noora Hamad S Al-Qahtani, Doha (QA); Ramazan Kahraman, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 0 days.

(21) Appl. No.: 19/081,453

(22) Filed: Mar. 17, 2025

(65) Prior Publication Data

US 2025/0297112 A1 Sep. 25, 2025

Related U.S. Application Data

(60) Provisional application No. 63/567,233, filed on Mar. 19, 2024.

(51) Int. Cl.

| | |
|---|---|
| ***C09D 7/80*** | (2018.01) |
| ***C09D 5/08*** | (2006.01) |
| ***C09D 7/62*** | (2018.01) |
| ***C09D 163/00*** | (2006.01) |
| *C08K 9/12* | (2006.01) |

(52) U.S. Cl.

CPC ............... *C09D 5/084* (2013.01); *C09D 7/62* (2018.01); *C09D 7/80* (2018.01); *C09D 163/00* (2013.01); *C08K 9/12* (2013.01)

(58) Field of Classification Search

CPC . C09D 5/084; C09D 7/80; C09D 7/62; C09D 163/00

See application file for complete search history.

(56) References Cited

U.S. PATENT DOCUMENTS

| | | | | |
|---|---|---|---|---|
| 9,982,142 | B2 | 5/2018 | Liu et al. | |
| 2011/0134585 | A1* | 6/2011 | Shen | H01G 11/36 252/502 |
| 2017/0066928 | A1 | 3/2017 | Camps et al. | |
| 2018/0057696 | A1* | 3/2018 | Pourhashem | C08J 3/203 |
| 2024/0010846 | A1* | 1/2024 | Aziz | C09D 163/00 |

FOREIGN PATENT DOCUMENTS

| | | | | |
|---|---|---|---|---|
| CN | 110818569 | * | 2/2020 | C07C 209/00 |
| CN | 111793373 | A | 10/2020 | |
| CN | 111973757 | * | 11/2020 | A61K 47/69 |
| JP | 2005054074 | A | 3/2005 | |

OTHER PUBLICATIONS

Alavi, Seyed Jamal, et al., "Role of polyethyleneimine (PEI) in synthesis of zinc oxide nanoparticles and their cytotoxicity effects". Ceramics International, 41 (2015) 10222-10226.*

Kumar, A. Madhan, et al., "Novel polyaniline/chitosan/reduced graphene oxide ternary nanocomposites: Feasible reinforcement in epoxy coatings on mild steel for corrosion protection". Progress in Organic Coatings, 163 (2022) 106678, pp. 1-16.*

Thieme, Soren, et al., "High capacity micro-mesoporous carbon-sulfur nanocomposite cathodes with enhanced cycling stability prepared by a solvent-free procedure". Journal of Materials Chemistry A, 2013, 1, 9225-9234.*

Shiryaev, M.A., et al. "ZnO Nanoparticle Modification by Polyethylenimine for Biomolecule Conjugation". Nanotechnologies in Russua, 2017, vol. 12, Nos. 11-12, pp. 613-619.*

Samad, et al.; "Effect of Incorporated ZnO Nanoparticles on the Corrosion Performance of SiO2 Nanoparticle-Based Mechanically Robust Epoxy Coatings"; MDPI; Aug. 2020; (17 pages).

* cited by examiner

*Primary Examiner* — Bret P Chen

(74) *Attorney, Agent, or Firm* — K&L Gates LLP

(57) ABSTRACT

A nanocomposite material is provided. The nanocomposite material includes a mesoporous carbon functionalized with ZnO-loaded polyethyleneimine. The nanocomposite material is a nanocomposite coating used to mitigate corrosion in saline water. The mesoporous carbon is a filler to enhance corrosion resistance properties of an epoxy coating. Additionally, methods for preparing a nanocomposite material and an epoxy coating for use in mitigating corrosion in saline water are provided. The method includes providing epoxy, mesoporous carbon, zinc acetate, polyethyleneimine, methanol, and NaOH; dispersing mesoporous carbon in methanol and zinc acetate to create a mixture; adding NaOH to the mixture; and filtering the nanocomposite material from the first mixture.

13 Claims, 8 Drawing Sheets

FIG. 2A
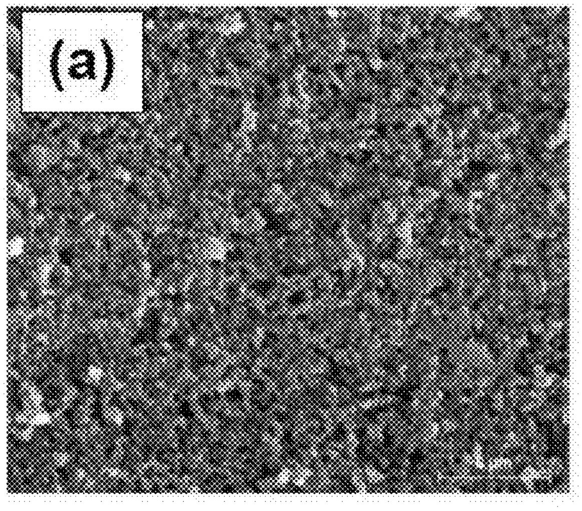
FIG. 2B
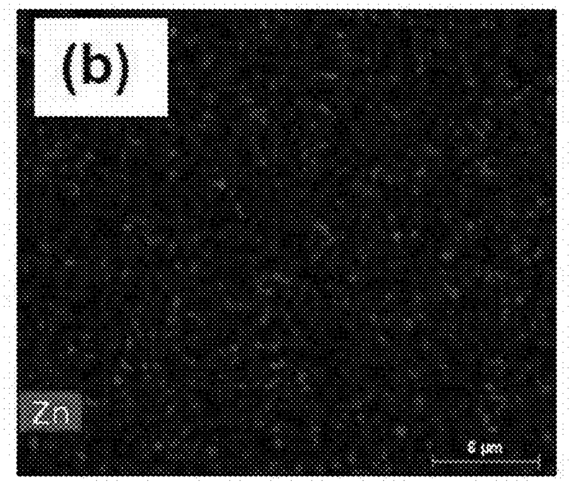
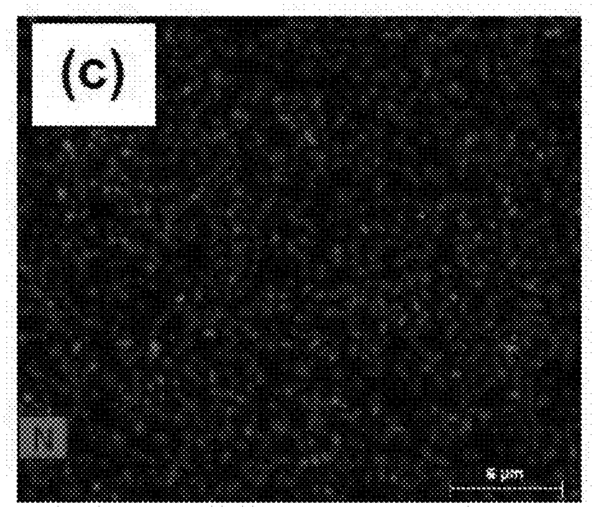
FIG. 2C

FIG. 4A
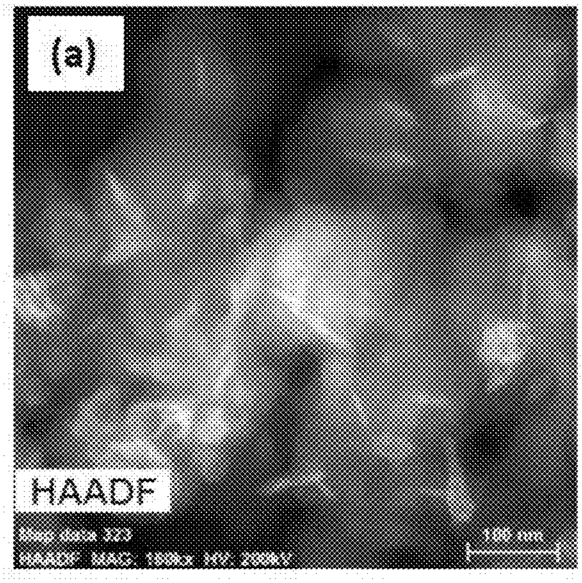
FIG. 4B
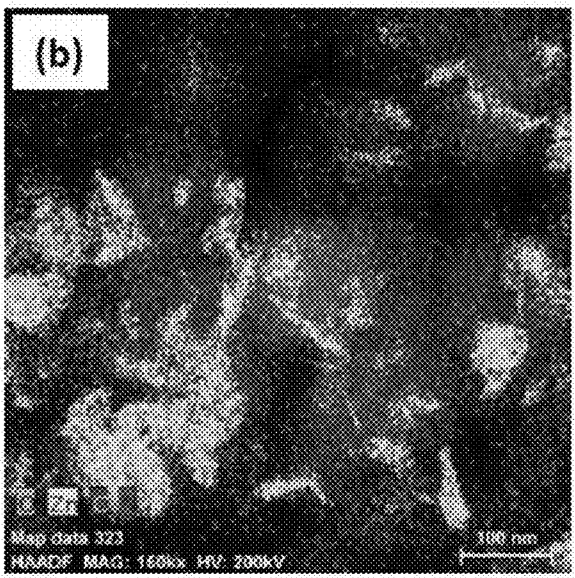
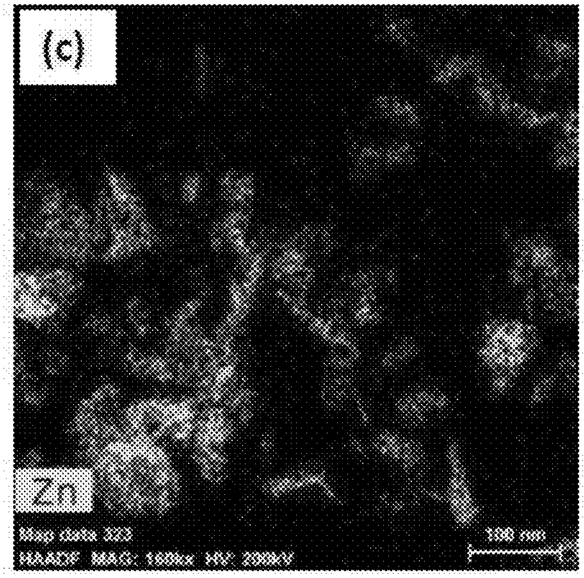
FIG. 4C
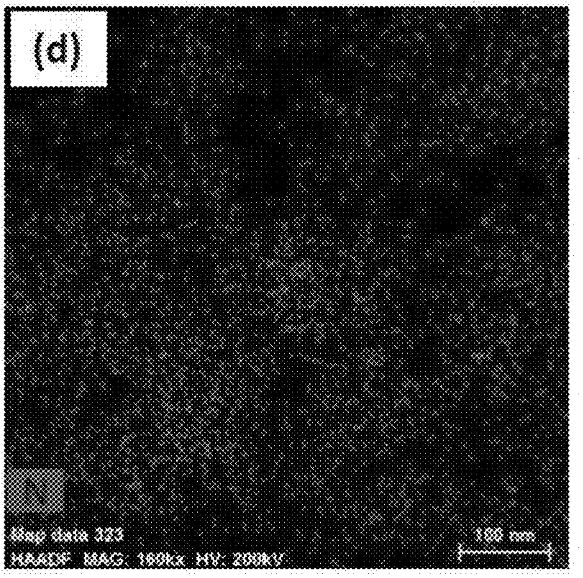
FIG. 4D

FIG. 8A
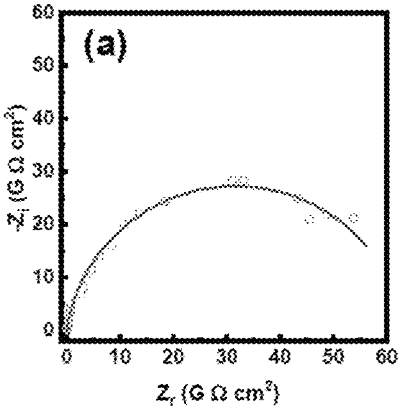
FIG. 8B
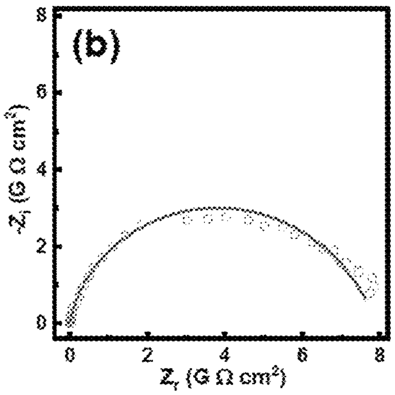
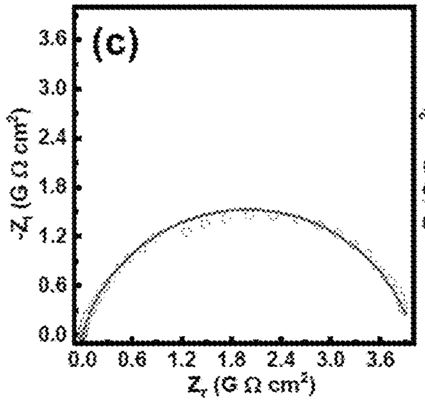
FIG. 8C
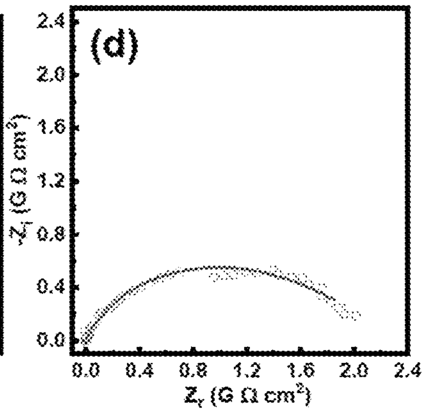
FIG. 8D
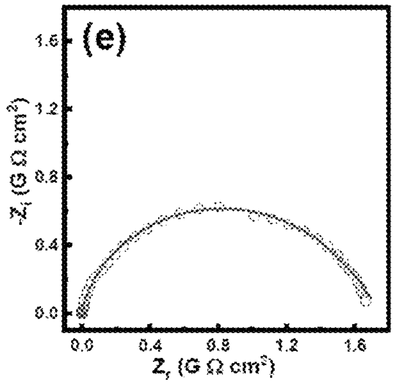
FIG. 8E
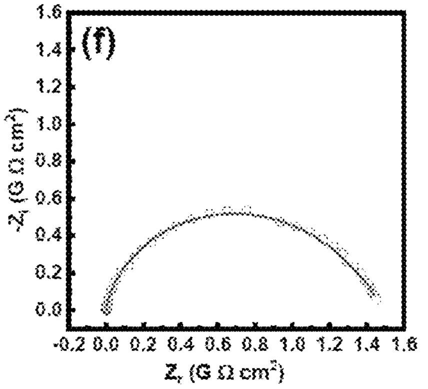
FIG. 8F

SOLVENT-FREE FUNCTIONALIZED MESOPOROUS CARBON/ZINC OXIDE NANOADDITIVES FOR REMARKABLE IMPROVEMENT IN CORROSION RESISTANCE OF POLYMERIC COATINGS

PRIORITY CLAIM

This application claims the benefit of and priority to U.S. Provisional Patent Application No. 63/567,233, filed on Mar. 19, 2024, the entire disclosure of which is incorporated by reference herein.

BACKGROUND

Epoxy compounds are commonly used in paints and coatings. For metals and other materials, epoxy coatings provide a quick-drying, tough, and protective surface. Epoxy coatings are used for a variety of purposes, including steel corrosion resistant coatings, renewable energy, construction and buildings, storage tanks, industrial equipment, and marine applications.

In steel corrosion resistance coatings, steel pipes, fittings, and rebar used in concrete, oil, and gas pipelines benefit from Fusion Bonded Epoxy Powder Coatings for corrosion protection. Under the effect of electrochemical corrosion, the degradation of metal and metal alloys is a high-cost problem faced by nearly all industries. Therefore, reducing corrosion processes and preventing future problems require detailed knowledge of these techniques and the strategies to avoid them. In this context, it is crucial to employ methodologies that may alleviate the electrochemical degradation of metals and monitor their performance in corrosive environments. Among them, is the usage of functional coatings, particularly nanocomposite coatings.

In renewable energy, a wide range of renewable and non-renewable energy sources are produced, transformed, and distributed using epoxy resins. In hydroelectric power stations, epoxy prevents salt-water corrosion on the steel bodies of wind turbine poles, blades, and the structures. In addition to improving the turbine's strength-to-weight ratio, epoxy allows longer, more efficient blades to be produced.

In construction and buildings, reinforcing bars are coated with epoxy as a barrier against moisture and chlorides that would otherwise erode their surface. In environments prone to accelerated corrosion, epoxy coated rebar provides additional protection. In corrosion-prone areas such as gulf area, reinforcing bars are becoming more widely used as concrete is employed in different applications.

In storage tank applications, epoxy coatings are often used to protect the internal and external surfaces of storage tanks that contain corrosive chemicals or liquids. The coatings can resist chemical attack and protect the tank from corrosion, which can compromise the integrity of the tank and potentially cause leaks.

In industrial applications, epoxy coatings are used to protect metal surfaces from corrosion. These coatings are commonly applied to equipment such as pumps, valves, and heat exchangers, helping to prevent corrosion and extend their lifespan.

In marine applications, epoxy coatings are used to protect metal surfaces on boats, ships, and other marine structures from the harsh marine environment. The coatings can resist the corrosive effects of saltwater, as well as provide protection against abrasion and impact damage.

Overall, the use of epoxy coatings for corrosion protection in industry is widespread and varied, with applications in many different sectors. Epoxy coatings offer a reliable and cost-effective solution for protecting metal surfaces from corrosion, which can help to improve the safety, reliability, and longevity of industrial equipment and infrastructure.

However, all uses of epoxy coatings often exhibit substantial corrosion. Corrosion of metals, and concrete can be caused by chemical or electrochemical actions of ambient environmental media. For instance, gas and oil wells include sucker rods, pump rods, tubing, and casing that are generally made of mild steel that are adversely affected by the production fluid. The global economic losses are between 700 billion and one trillion dollars as a result of corrosion.

Several techniques have been developed to alleviate the corrosion rate. Epoxy, polyurethane, and zinc-rich primers constitute the most common anti-corrosion coatings. Epoxy anti-corrosion coatings are known for their outstanding adhesion, alkali resistance, superior mechanical properties, high content of solids, and chemical medium corrosion resistance. Nonetheless, the coating films formed from the epoxy anti-corrosion coatings are brittle and rigid at the early stage. On the other hand, polyurethane coatings possess advantages such as water resistance, strong adhesion, oil resistance, solvent resistance, good elasticity, high strength and corrosion resistance, and low temperature resistance. Additionally, the formed films are stiff, thick, bright, flexible, wear-resistant, and scratch-resistant. Further, the formed films do not retain gloss or colors and are highly irritating and noxious.

In addition to their anticorrosion properties, zinc-rich primer coatings have many other benefits, such as electrochemical protection, self-healing, and inactivating properties. However, zinc-rich primer coatings sacrifice zinc powder for these properties, generating large amounts of zinc oxide vapor during welding, which is harmful to workers.

SUMMARY

The present disclosure relates to a nanocomposite material, such as a nanocomposite coating, for example, developed through the functionalization of the mesoporous carbon with zinc nanoparticles and polyethyleneimine as a corrosion inhibitor leading to a significant increase in the corrosion resistance in saline water. The low loading content of 1.2 wt. % of ZnO nanoparticles product reduces the need for zinc-rich coatings, and the amount of zinc oxide vapor produced during welding, which makes product more environmentally friendly. The newly developed nanomaterial is easily prepared and can be directly mixed with the epoxy resin without the necessity of the addition of any solvent. The as-prepared coating exhibited superior corrosion resistance in saline water.

An advantage to the present disclosure is that testing results of the novel coating demonstrate superior long-term corrosion resistance in the formulation and durability. Further, the present disclosure consists of a coating that is easy to prepare, is low-cost, and can be manufactured industrially.

The present disclosure further provides the capability of reducing corrosion on metal substrates while avoiding the use of toxic heavy metals, such as chromium, which can endanger the environment.

According to one non-limiting aspect of the present disclosure, an example embodiment of a nanocomposite material is provided. In one embodiment, the nanocomposite material includes a mesoporous carbon functionalized with zinc oxide-loaded polyethyleneimine.

In another aspect of the present disclosure, which may be combined with any other aspect listed herein unless specified otherwise, the nanocomposite material used to mitigate corrosion in saline water.

In another aspect of the present disclosure, which may be combined with any other aspect listed herein unless specified otherwise, the polyethyleneimine is absorbed on a surface of mesoporous carbon.

In another aspect of the present disclosure, which may be combined with any other aspect listed herein unless specified otherwise, wherein the ZnO-loaded polyethyleneimine is 1.2 wt. % of the mesoporous carbon.

In another aspect of the present disclosure, which may be combined with any other aspect listed herein unless specified otherwise, the mesoporous carbon is a filler to enhance corrosion resistance properties of an epoxy coating.

In another aspect of the present disclosure, which may be combined with any other aspect listed herein unless specified otherwise, the epoxy coating is a polymeric coating.

In another aspect of the present disclosure, which may be combined with any other aspect listed herein unless specified otherwise, the nanocomposite material is free of solvents.

In another aspect of the present disclosure, which may be combined with any other aspect listed herein unless specified otherwise, a method of preparing a nanocomposite material and an epoxy coating for use in mitigating corrosion in saline water includes providing epoxy, mesoporous carbon, zinc acetate, polyethyleneimine, methanol, and NaOH; dispersing mesoporous carbon in methanol and zinc acetate to create a mixture; adding NaOH to the mixture; and filtering the nanocomposite material from the mixture.

In another aspect of the present disclosure, which may be combined with any other aspect listed herein unless specified otherwise, the nanocomposite material is a mesoporous carbon functionalized with ZnO-loaded polyethyleneimine.

In another aspect of the present disclosure, which may be combined with any other aspect listed herein unless specified otherwise, the polyethyleneimine is prepared in a solution with 50 wt. % $H_2O$.

In another aspect of the present disclosure, which may be combined with any other aspect listed herein unless specified otherwise, the method further includes annealing the nanocomposite material.

In another aspect of the present disclosure, which may be combined with any other aspect listed herein unless specified otherwise, the annealing the nanocomposite material occurs at 450° C.

In another aspect of the present disclosure, which may be combined with any other aspect listed herein unless specified otherwise, the method further includes coating the nanocomposite material onto a steel substrate.

In another aspect of the present disclosure, which may be combined with any other aspect listed herein unless specified otherwise, the nanocomposite material has a thickness of approximately 111±5 μm when coated onto a steel substrate.

In another aspect of the present disclosure, which may be combined with any other aspect listed herein unless specified otherwise, the method further includes curing the nanocomposite material and steel substrate.

In another aspect of the present disclosure, which may be combined with any other aspect listed herein unless specified otherwise, the curing of the nanocomposite material and steel substrate occurs at approximately 20° C. to 25° C.

In another aspect of the present disclosure, which may be combined with any other aspect listed herein unless specified otherwise, the method further includes adding 3.5 wt. % NaCl to the mixture.

In another aspect of the present disclosure, which may be combined with any other aspect listed herein unless specified otherwise, the method further includes loading mesoporous carbon with ZnO nanoparticles.

In another aspect of the present disclosure, which may be combined with any other aspect listed herein unless specified otherwise, the ZnO nanoparticles are 1.2 wt. % of the mesoporous carbon.

In another aspect of the present disclosure, which may be combined with any other aspect listed herein unless specified otherwise, the method further includes adding a hardener to the mixture.

Additional features and advantages are described by way of example in, and will be apparent from, the following Detailed Description and the Figures. The figures are schematic and are not intended to be drawn to scale. The features and advantages described herein are not all-inclusive and, in particular, many additional features and advantages will be apparent to one of ordinary skill in the art in view of the figures and description. In addition, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE FIGURES

Features and advantages of the present disclosure, including, for example, a nanocomposite material and a process and system for solvent-free functionalized mesoporous carbon/zinc oxide nanoadditives, described herein may be better understood by reference to the accompanying drawings in which:

FIG. 2(*a*) is a scanning electron microscope ("SEM") image of the surface of MC-ZnO loaded with polyethyleneimine ("PEI") and corresponding energy dispersive x-ray ("EDX") mapping, according to an embodiment of the present disclosure.

FIG. 2(*b*) is a SEM image of the surface of MC-ZnO loaded with PEI and corresponding EDX mapping of zinc, according to an embodiment of the present disclosure.

FIG. 2(*c*) is a SEM image of the surface of MC-ZnO loaded with PEI and corresponding EDX mapping of nitrogen, according to an embodiment of the present disclosure.

FIG. 4(*a*) is a high-angle annular dark-field ("HAADF")-STEM image, according to an embodiment of the present disclosure.

FIG. 4(*b*) is a HAADF-STEM elemental mapping image of C, Zn, O, and N within ZnO-loaded PEI functionalized mesoporous carbon, according to an embodiment of the present disclosure.

FIG. 4(*c*) is a HAADF-STEM elemental mapping image of Zn within ZnO-loaded PEI functionalized mesoporous carbon, according to an embodiment of the present disclosure.

FIG. 4(*d*) is a HAADF-STEM elemental mapping image of N within ZnO-loaded PEI functionalized mesoporous carbon, according to an embodiment of the present disclosure.

FIG. 8(*a*) is an electrochemical impedance spectroscopy ("EIS") measurement of the as-prepared MC-ZnO/PEI nanocomposite coatings after 1 day of immersion in 3.5 wt. % NaCl, according to an embodiment of the present disclosure.

FIG. 8(*b*) is an EIS measurement of the as-prepared MC-ZnO/PEI nanocomposite coatings after 7 days of immersion in 3.5 wt. % NaCl, according to an embodiment of the present disclosure.

FIG. 8(*c*) is an EIS measurement of the as-prepared MC-ZnO/PEI nanocomposite coatings after 15 days of immersion in 3.5 wt. % NaCl, according to an embodiment of the present disclosure.

FIG. 8(*d*) is an EIS measurement of the as-prepared MC-ZnO/PEI nanocomposite coatings after 21 days of immersion in 3.5 wt. % NaCl, according to an embodiment of the present disclosure.

FIG. 8(*e*) is an EIS measurement of the as-prepared MC-ZnO/PEI nanocomposite coatings after 30 days of immersion in 3.5 wt. % NaCl, according to an embodiment of the present disclosure.

FIG. 8(*f*) is an EIS measurement of the as-prepared MC-ZnO/PEI nanocomposite coatings after 60 days of immersion in 3.5 wt. % NaCl, according to an embodiment of the present disclosure.

Figure 1:
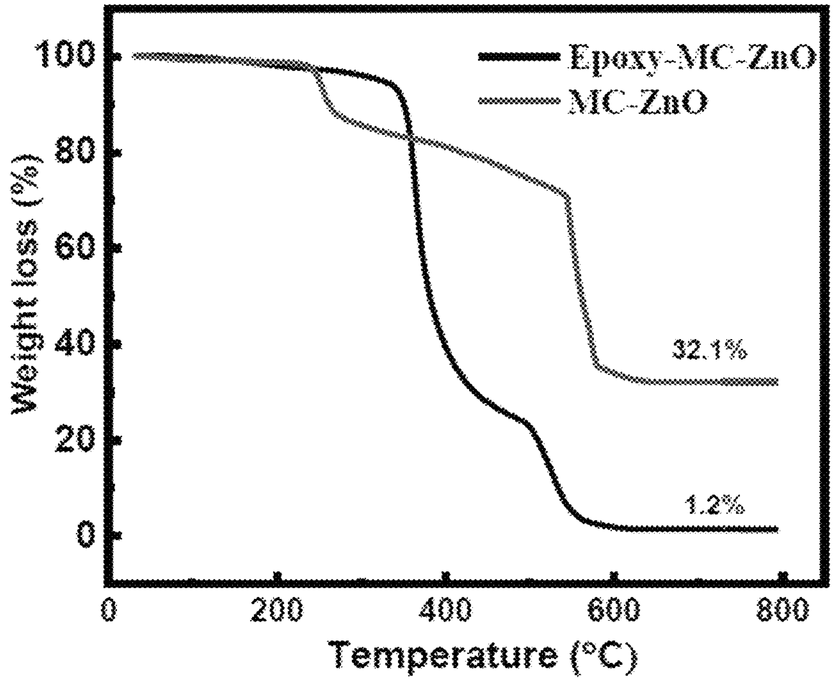
FIG. 1 is a graph illustrating a thermogravimetric analysis ("TG-A") of the functionalized mesoporous carbon ("MC-ZnO") and the nanocomposite epoxy coating, according to an embodiment of the present disclosure.

The reader will appreciate the foregoing details, as well as others, upon considering the following detailed description of certain non-limiting embodiments of the present disclosure.

DETAILED DESCRIPTION

The present disclosure is generally related to nanocomposite material. More specifically, the present disclosure relates to a nanocomposite coating that includes epoxy and solvent-free zinc oxide ("ZnO") nanoparticles decorated mesoporous carbon ("MC") loaded with polyethyleneimine ("PEI"), such as, a corrosion inhibitor referred to as MC-ZnO/PEI. Non-limiting embodiments of the present disclosure will be described by way of example with reference to the accompanying figures, which are not intended to be drawn to scale.

A nanocomposite coating, MC-ZnO/PEI, includes epoxy and solvent-free ZnO nanoparticles decorated MC loaded with PEI as a corrosion inhibitor. The nanocomposite material is cost-effective and easy to synthesize which allows the system to be effectively commercialized. The functionalization of mesoporous carbon with ZnO greatly alleviated the amount of zinc powder required in the coating (lower than that required by the existing standard of HG/T3668-2009). Functionalization of mesoporous carbon significantly enhances the corrosion resistance of the epoxy coating rather than the traditional approaches of physically mixing a high content of zinc with epoxy. Additionally, it substantially reduces the amount of ZnO vapor produced during welding, which makes it more environmentally friendly. Accordingly, utilizing this coating eliminates the need for zinc-rich coatings, which compromise zinc powder in exchange for anti-corrosion features.

In the present disclosure, solvent-free nanoadditives were developed to modify the properties of polymeric coatings. Towards this direction, PEI was absorbed on the surface of mesoporous carbon/loaded with ZnO nanoparticles demonstrating high anti-corrosion properties in saline water. Mesoporous carbon with a surface area of nearly 300 $m^3/g$ exhibits a high-capacity loading of ZnO up to 32%, which acts as inactive nanoparticles preventing the ingress of the hydrated species of chloride. This combination provides superior corrosion protection due to synergistic effects. The corrosion resistance is considerably increased by the addition of 3 wt. % of MC-ZnO/PEI to the epoxy coating (i.e., 1.2 wt. % ZnO added to the epoxy coating). It is noteworthy that the mechanical properties of the epoxy coatings are significantly increased with the addition of the functionalized MC-ZnO/PEI.

In the present disclosure, mesoporous carbon functionalized with ZnO-loaded PEI was synthesized as a filler to enhance the corrosion resistance properties of the epoxy coating. Mesoporous carbon was loaded with ZnO nanoparticles employing the sol-gel process of created a gel by solvent dissolution. To prepare for synthesis, the materials including epoxy, mesoporous carbon, zinc acetate, polyethyleneimine (having a molecular weight of ~60,000 and 50 wt. % in $H_2O$), methanol, NaOH, and Epicure 3223 from Miller-Stephenson is obtained. First, 0.6 g of mesoporous carbon is dispersed ultrasonically in a 30 mL methanol solution containing 1.2 g of zinc acetate ($Zn(CH_3COO)_2 \cdot 2H_2O$) for 90 minutes. Then, 15 mL of 0.4 M NaOH/methanol solution was slowly added to the above methanol solution under magnetic stirring. A black powder ($Zn(OH)_2$/MC) within the solution is collected by filtration after 60 minutes of reaction. Finally, ZnO/MC was produced by annealing the black powder at 450° C. for 2 hours under purging of nitrogen.

Epoxy coatings generally contain only mesoporous carbon. The modified coating contains mesoporous carbon coated with ZnO nanoparticles/PEI loaded. As a first step, 3.0 wt. % of MC-ZnO/PEI is carefully dispersed into the epoxy resin at 815° C. After stirring for 15 minutes, the hardener (Epicure 3223) is added at a 4:1 ratio and is stirred for 5 minutes. Then, the formulated epoxy is coated on the surface of steel substrates by the doctor's blade technique of spreading a thin, uniform layer of the formulated epoxy on the surface of the steel substrate. The coated substrates are kept for curing at room temperature (approximately between 20° C. to 25° C. From this process, a dry film having a thickness of ~111±5 μm is attained.

Several characterization tools were used to characterize the material. The particle size and the morphology are understood using transmission electron microscopy. The dynamic mechanical properties are explored employing a mechanical analyzer. The corrosion resistance of the as-prepared nanocomposite coatings is evaluated at different immersion time intervals in saline water. Thermogravimetric analysis ("TG-A") is performed to explore the loading capacity of zinc nanoparticles.

FIG. 1 utilizes TG-A to illustrate the loaded amount of ZnO nanoparticles in the mesoporous carbon before and after the addition of MC-ZnO to epoxy. It was found that the remaining weight percentage of ZnO nanospecies after burning in the air was around 32 wt. % loaded in mesoporous carbon. However, after the addition of 3 wt. % of MC-ZnO to the epoxy coating, the loading amount is 1.2 wt. %. The TG-A was performed in the presence of air with a heating rate of 10° C./min.

FIGS. 2(*a*)-(*c*) illustrate a field emission scanning electron microscopy ("FE-SEM") image of the surface of MC-ZnO loaded with polyethyleneimine ("PEI") and corresponding energy dispersive x-ray ("EDX") mapping. FIG. 2(*a*) illustrates a FE-SEM image of MC-ZnO/PEI. FIG. 2(*b*) illustrates a FE-SEM image of the MC-ZnO/PEI and corresponding EDX mapping of zinc. FIG. 2(*c*) illustrates a FE-SEM image of the MC-ZnO/PEI and corresponding EDX mapping of nitrogen.

Figure 3:
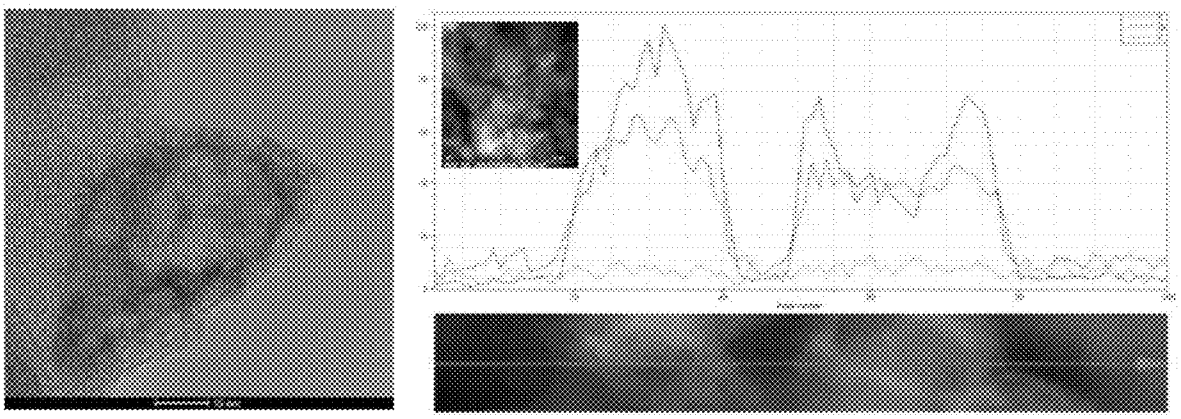
FIG. 3 is a transmission electron microscopy ("TEM") image of MC-ZnO loaded with PEI and an accompanying line mapping, according to an embodiment of the present disclosure.

FIG. 3 illustrates the transmission electron microscopy ("TEM") image and accompanying line scan analysis. This data illustrates that the ZnO has successfully decorated the mesoporous carbon surface with a particle size in the range of 4 nm. In addition, the elemental mapping analysis confirmed that the loading and functionalization of mesoporous carbon with ZnO nanoparticles coated with PEI inhibitors is shown in FIGS. 4(*a*)-(*d*).

FIG. 4(*a*) depicts a high-angle annular dark-field ("HAADF")-STEM image. FIGS. 4(*b*) to 4(*d*) depict elemental mapping images of ZnO-loaded PEI functionalized mesoporous carbon where FIG. 4(*b*) is a HAADF-STEM elemental mapping image of C, Zn, O, and N within ZnO-loaded PEI functionalized mesoporous carbon; FIG. 4(*c*) is a HAADF-STEM elemental mapping image of Zn within ZnO-loaded PEI functionalized mesoporous carbon; and FIG. 4(*d*) is a HAADF-STEM elemental mapping image of N within ZnO-loaded PEI functionalized mesoporous carbon.

Figure 6:
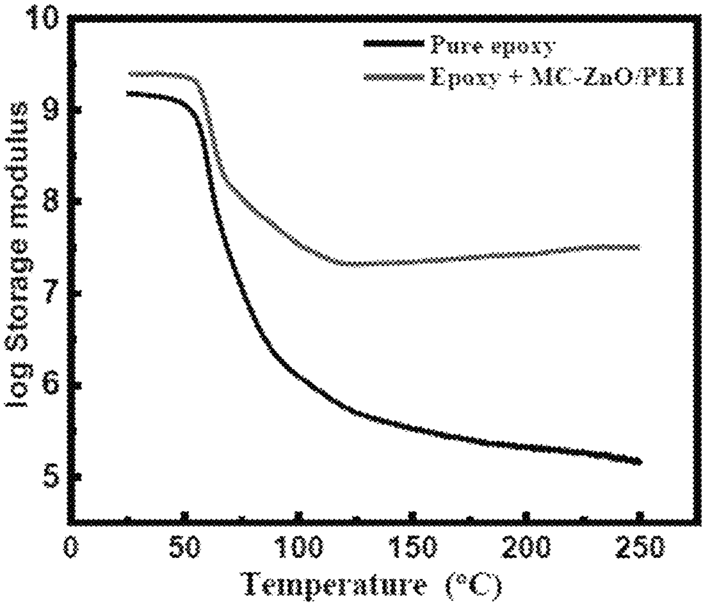
FIG. 6 is a graph illustrating the evolution of the storage modulus, G', as a function of temperature for pure epoxy coating and nanocomposite MC-ZnO/PEI coating, according to an embodiment of the present disclosure.

FIG. 6 illustrates the dynamic thermomechanical properties ("DMA"), such as the storage modulus, of the epoxy coating before and after the addition of MC-ZnO/PEI. Specifically, the data of FIG. 6 illustrates the evolution of the storage modulus, G', as a function of temperature for pure epoxy coating and nanocomposite MC-ZnO/PEI coating. It is worth mentioning that the storage modulus of the epoxy and MC-ZnO/PEI significantly increase compared to the pure epoxy indicating the increase of the mechanical properties and the tensile strength. The storage modulus, G', may be dramatically affected by the mass fraction of ZnO nanospecies in the epoxy matrix in glass or rubber states. In addition to the uniform dispersion of the ZnO nanoparticles in the epoxy matrix, the storage modulus of nanocomposite coating is higher than that of pure epoxy which is attributed to the generated van der Waals force between the ZnO nanoparticle surface and the epoxy resin leading to obstructing the movement of the epoxy resin chain segments.

Figure 7:
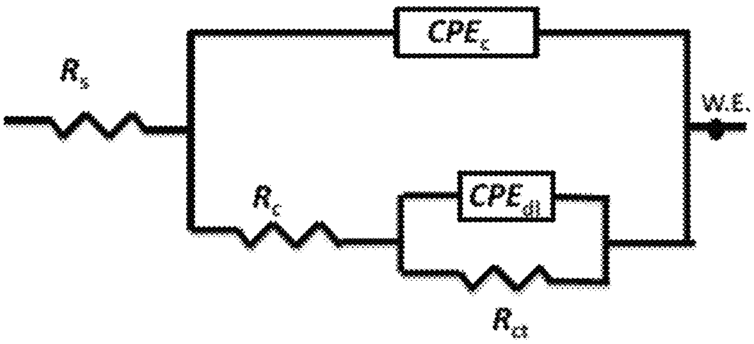
FIG. 7 is an illustration of equivalent electrical circuits for nanocomposite coatings, according to an embodiment of the present disclosure.

The corrosion resistance of the pure epoxy and modified coatings was evaluated in saline water using electrochemical impedance spectroscopy ("EIS") and was fitted employing the depicted equivalent circuit in FIG. 7. The Nyquist EIS plots of the modified epoxy coatings after immersion in saline water are provided in FIGS. 8(*a*)-(*f*). FIG. 8(*a*) illustrates measurements of the nanocomposite coating after 1 day of immersion in 3.5 wt. % NaCl. FIG. 8(*b*) illustrates measurements of the nanocomposite coating after 7 days of immersion in 3.5 wt. % NaCl. FIG. 8(*c*) illustrates measurements of the nanocomposite coating after 15 days of immersion in 3.5 wt. % NaCl. FIG. 8(*d*) illustrates measurements of the nanocomposite coating after 21 days of immersion in 3.5 wt. % NaCl. FIG. 8(*e*) illustrates measurements of the nanocomposite coating after 30 days of immersion in 3.5 wt. % NaCl. FIG. 8(*f*) illustrates measurements of the nanocomposite coating after 60 days of immersion in 3.5 wt. % NaCl.

Below, Table 1 illustrates the electrochemical fitting parameters of the nanocomposite epoxy coating including the immersion time, $R_c$, $R_{ct}$, $C_{dl1}$, and $C_{dl2}$. The results were obtained from the fitting of the equivalent circuit as illustrated in FIG. 7.

TABLE 1

Electrochemical fitting parameters of the nanocomposite epoxy coating.

| | Immersion time (days) | $R_c$ (k Ω cm$^2$) | $R_{ct}$ (k Ω cm$^2$) | $C_{dl1}$ (μF) | $C_{dl2}$ (μF) |
|---|---|---|---|---|---|
| Pure epoxy | 1 | 26 ± 3 | 32 ± 4 | 0.007 ± 0.002 | 0.003 ± 0.001 |
| | 7 | 8 ± 3 | 11 ± 2 | 0.006 ± 0.001 | 0.004 ± 0.002 |
| | 14 | 4.3 ± 3 | 6.4 ± 1 | 0.008 ± 0.002 | 0.006 ± 0.002 |
| | 21 | 2.5 ± 2 | 3.2 ± 4 | 0.02 ± 0.01 | 0.008 ± 0.001 |
| | 28 | 1.8 ± 3 | 2.6 ± 3 | 0.06 ± 0.02 | 0.04 ± 0.02 |
| | 60 | 0.4 ± 4 | 0.76 | 0.09 ± 0.03 | 0.05 ± 0.03 |
| MC-ZnO/PEI nanocomposite coatings | 1 | $44 \times 10^6 \pm 2$ | $56 \times 10^6 \pm 3$ | $1.2 \times 10^{-5} \pm 1$ | $3.2 \times 10^{-8} \pm 1$ |
| | 7 | $6.0 \times 10^6 \pm 3$ | $8.0 \times 10^6 \pm 2$ | $2.8 \times 10^{-5} \pm 1$ | $2.5 \times 10^{-7} \pm 2$ |
| | 14 | $2.8 \times 10^6 \pm 2$ | $3.8 \times 10^6 \pm 1$ | $1.4 \times 10^{-4} \pm 2$ | $5.1 \times 10^{-5} \pm 2$ |
| | 21 | $1.6 \times 10^6 \pm 1$ | $2.0 \times 10^6 \pm 2$ | $1.3 \times 10^{-4} \pm 1$ | $3.2 \times 10^{-4} \pm 1$ |
| | 28 | $1.2 \times 10^6 \pm 2$ | $1.7 \times 10^6 \pm 1$ | $9.6 \times 10^{-5} \pm 2$ | $8.4 \times 10^{-11} \pm 2$ |
| | 60 | $0.98 \times 10^6 \pm 1$ | $1.5 \times 10^6 \pm 1$ | $5.4 \times 10^{-5} \pm 2$ | $2.3 \times 10^{-11} \pm 1$ |

Figure 5:
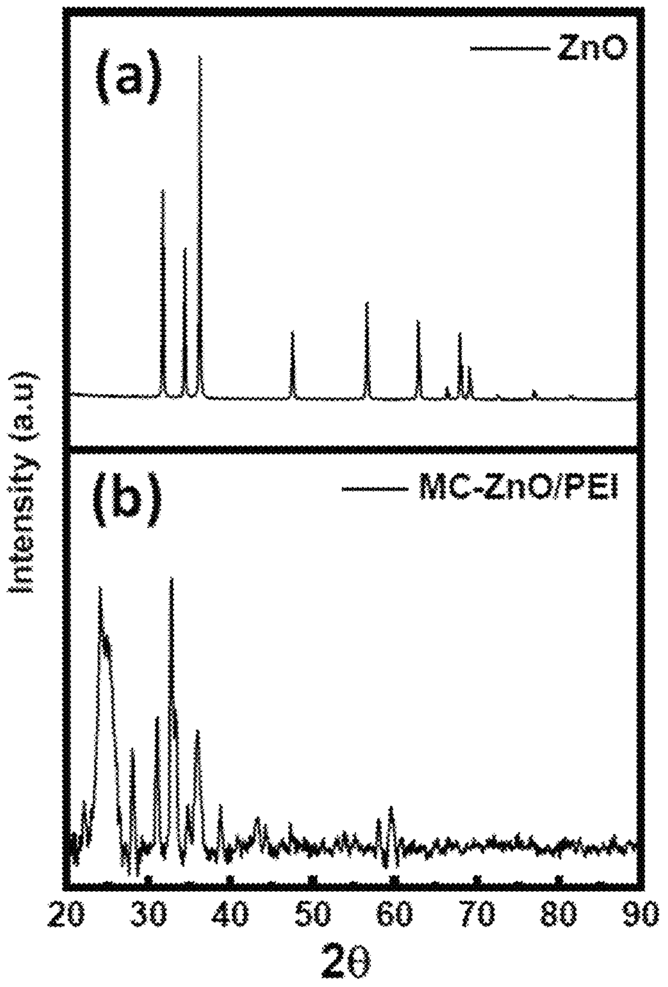
FIG. 5 illustrates views (a) and (b), where (a) is an x-ray diffraction ("XRD") graph illustrating the intensity of ZnO particles before loading on mesoporous carbon, according to an embodiment of the present disclosure, and where (b) is an XRD graph illustrating the intensity of ZnO particles after loading on mesoporous carbon, according to an embodiment of the present disclosure

FIGS. 5(*a*) and 5(*b*) depict the results of the x-ray diffraction ("XRD") graph of the as-prepared ZnO particles before and after loading on the mesoporous carbon. The diffraction peaks located at 31.9°, 34.52°, 36.4°, 47.5°, 56.6°, 63.01°, 68.08°, and 69.2° are attributed to the hexagonal wurtzite phase of ZnO nanospecies. However, the peak located at 2θ=19.3 and 29° are ascribed to the PEI.

$R_s$ signifies electrolyte resistance. The capacitive element is represented by a constant phase element ("CPE"), where $CPE_{dl}$ is double-layer capacitance and $R_{ct}$ is charge transfer resistance. On the other hand, the $CPE_c$ and $R_c$ are attributed to the coating capacitance and coating resistance, respectively. As listed in Table 1. The modified epoxy coating shows a charge transfer resistance ($R_{ct}$) of $5.8 \times 10^{10}$ Ωcm$^2$ after one day of immersion which is significantly higher than that of the pure epoxy by six orders of magnitude. However, the corrosion resistance alleviated after 7 days of immersion to $8\times10^9$ $\Omega cm^2$ compared to $1.1\times10^4$ $\Omega cm^2$ of the pure epoxy. It is worth mentioning that the corrosion resistance decreased to $1.5\times10^9$ $\Omega cm^2$ after immersion of the modified coating in the saline water for 60 days in comparison to $0.76\times10^3$ $\Omega cm^2$ of the $R_{ct}$ pure epoxy. Further, the double layer capacitance of the modified epoxy dropped from $3.2\times10^{-8}$ μF to $3.2\times10^{-4}$ μF as a result of permeation of the hydrated chloride species through the internal defects of the pure epoxy coating leading to attack the metal surface. The high corrosion resistance is attributed to the effective suppression of the ion exchange between the electrolyte and the steel surface and therefore extends the ions diffusion pathway to reach the carbon steel surface. In addition, the uniform distribution of the ZnO-loaded mesoporous carbon in the epoxy matrix promotes the crosslinking of organic molecules leading to alleviating the crack propagation and consequently declining the corrosion rate.

The as-prepared material can be easily uniformly dispersed in epoxy resin without any necessity for solvent. In comparison to zinc-rich epoxy coating, the nanocomposite coating with a loading content of 1.2% of ZnO nanoparticles, displayed a high corrosion resistance under continuous immersion in 3.5 wt. % NaCl for 60 days in saline water.

In other embodiments, this material may be further modified through the inclusion of different nanoparticles and inhibitors to further enhance the corrosion resistance of the epoxy coating.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of preparing a nanocomposite material and an epoxy coating for use in mitigating corrosion in saline water, comprising:

providing epoxy, mesoporous carbon, zinc acetate, polyethyleneimine, methanol, and NaOH;

dispersing mesoporous carbon in methanol and zinc acetate to create a mixture;

adding NaOH to the mixture; and filtering the nanocomposite material from the mixture.

2. The method of claim 1, wherein the nanocomposite material is a mesoporous carbon functionalized with ZnO-loaded polyethyleneimine.

3. The method of claim 1, wherein the polyethyleneimine is prepared in a solution with 50 wt. % $H_2O$.

4. The method of claim 1, further comprising annealing the nanocomposite material.

5. The method of claim 4, wherein the annealing the nanocomposite material occurs at 450° C.

6. The method of claim 1, further comprising coating the nanocomposite material onto a steel substrate.

7. The method of claim 6, wherein the nanocomposite material has a thickness of approximately 111±5 μm when coated onto a steel substrate.

8. The method of claim 6, further comprising curing the nanocomposite material and steel substrate.

9. The method of claim 8, wherein the curing of the nanocomposite material and steel substrate occurs at approximately 20° C. to 25° C.

10. The method of claim 1, further comprising adding 3.5 wt. % NaCl to the mixture.

11. The method of claim 1, further comprising loading mesoporous carbon with ZnO nanoparticles.

12. The method of claim 11, wherein the ZnO nanoparticles are 1.2 wt. % of the mesoporous carbon.

13. The method of claim 1, further comprising adding a hardener to the mixture.

* * * * *